Jan. 29, 1935.   R. A. COLLARD   1,989,633
ANIMATED LUMINOUS DISPLAY SYSTEM
Filed Sept. 4, 1931   3 Sheets-Sheet 1

R. A. Collard
INVENTOR
By: Marks & Clerk
Attys.

Jan. 29, 1935.  R. A. COLLARD  1,989,633
ANIMATED LUMINOUS DISPLAY SYSTEM
Filed Sept. 4, 1931  3 Sheets-Sheet 2
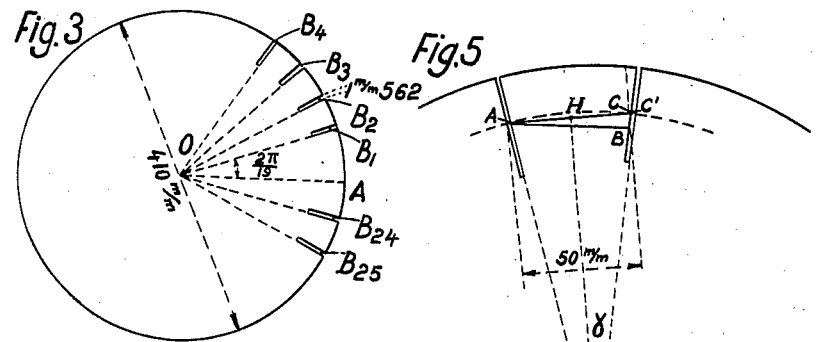
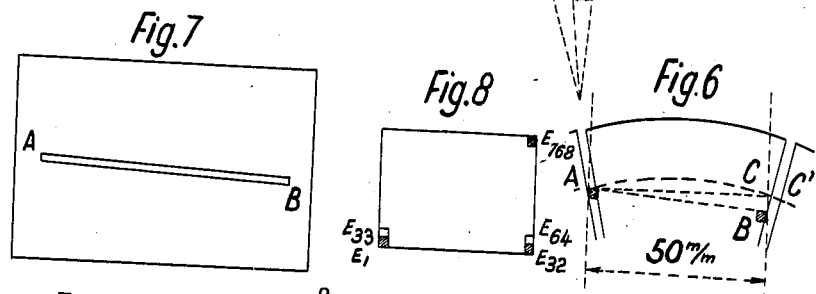
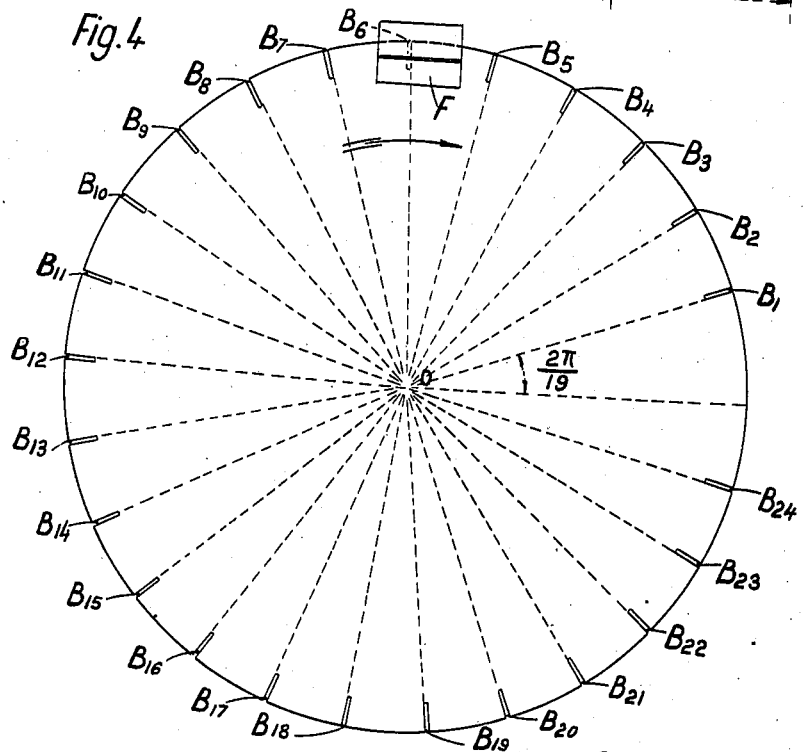
R. A. Collard
INVENTOR
By Machs & Clerk
ATTYS.

Jan. 29, 1935.   R. A. COLLARD   1,989,633
ANIMATED LUMINOUS DISPLAY SYSTEM
Filed Sept. 4, 1931    3 Sheets-Sheet 3

Patented Jan. 29, 1935

1,989,633

UNITED STATES PATENT OFFICE 1,989,633

ANIMATED LUMINOUS DISPLAY SYSTEM

Robert Alphonse Collard, Montrouge, France

Application September 4, 1931, Serial No. 561,276
In France July 10, 1931

1 Claim. (Cl. 177—346

The present invention relates to animated luminous images, and has for its object to produce, for advertising or other purposes, a great variety of luminous images by the use of a single board containing electric lamps which will afford an exact reproduction of the varied combinations of animated drawings of the motion picture class, and giving the appearance of motion in the same manner.

The luminous board consists of a great number of electric lamps in suitable disposition, whose lighting is controlled by a motion picture film arranged for animated drawings and serving to control circuits by means of a photo-electric cell.

Due to the successive lighting of a certain number of the lamps during the travel of a given image of the film, the spectator will have the impression of a simultaneous lighting by which the said image will be reproduced, and the sufficiently rapid succession of the different luminous images thus obtained will give the appearance of motion, according to a method analogous to the one employed for motion pictures.

The said arrangement provides for the production of images of all kinds, whether fixed or movable, such as letters or figures, which may form words or sentences for advertising or other purposes, or various drawings or designs, persons, animals, landscapes, objects, or the like.

The number of different images which can be formed will obviously depend upon the number of lamps on the board. With a greater number of lamps, the designer will have increased means for representing various subjects such as persons, animals, objects, scenes with different persons, etc., but in all cases, the arrangement permits to obtain all the signs, drawings or subjects which it is possible to produce with the lamps of the board. The letters, words or sentences thus obtained may be shown together with the drawings or subjects, or in succession. They may be used at will to give the appearance of motion, or may have the fixed position.

In the case of motion, the images on the film must be different, and must represent the successive steps of a given movement.

In the case of fixed images, the same image must be repeated a suitable number of times on the film. In fact, since the film travels in a continuous manner, the apparent fixed position of an image on the board is obtained by a repetition of the same elements on the film and by a corresponding repeated lighting of the same lamps on the board.

This arrangement is superior to all of the devices known to me for luminous advertising boards with moving images, since these latter will only afford a single scene with a very limited number of movements, and in order to reproduce a different scene, the board must be changed. On the contrary, the present arrangement enables the use of a single board for the reproduction of scenes of widely varying forms and movements, without any other limitation than the number of possible combinations afforded by the lamps in use.

Each image portion or surface of the film is decomposed into a number of unit parts or elements whose number is the same as that of the lamps of the board, and each element corresponds to a given lamp, whose lighting it controls. The image on the film consists of a certain number of such elements which are transparent (or white), the unused elements being opaque (or black). The image formed upon the lamp board consists of the lighted lamps, each corresponding to one of the white elements of the film, or otherwise stated, in any given film image, a white element will determine (by means analogous to the ones used in distant transmission of images) the lighting of the corresponding electric lamp of the luminous board, and inversely, when the same element, now opaque upon another film image, traverses the field, it will have no effect upon the same electric lamp, which is not lighted.

On the contrary to what prevails in the case of distant transmission of images, in which any given motion pictures are transmitted, the present arrangement is based upon the exclusive use of a film in which each image is formed in a particular manner. The images on the said film consist necessarily of the aforesaid elements. For example, if the said elements consist of squares obtained by crossed lines, forming a square pattern, the image to be reproduced, which is seen upon the film, consists exclusively of a certain number of such white squares. As above stated, each of such white squares will light the corresponding lamp of the board. This exact correspondence between a given point of the film and a given lamp of the board, in connection with an analysis which is specially conceived in order to cover all of the said elements, will assure an exact luminous reproduction of each of the film images. In particular, the elements of the outlines will be reproduced without exception. If the total number of such elements is small, the images to be reproduced, corresponding to a like reproduction on the lamp board, will evidently be diagrammatic, but the reproduction of such images will be nevertheless exact. On the contrary, devices comprising lamp boards which have been hitherto employed for the distant transmission of motion pictures, afford only an approximate reproduction of the images, which is necessarily defective in the outlines and is based upon mean effects which are only acceptable with an image divided into a very great number of elements.

This absolute correspondence which occurs in the first place between the number and the arrangement of elements which are arbitrarily selected and are represented upon a film, and in the second place between the number and the arrangement of the lamps of the board, constitutes the original feature and the principal base of the present system, and forms, together with the use of animated drawings for luminous advertising, one of the essential characteristics of the present invention.

The following description, with reference to the accompanying drawings, relates to an embodiment of the invention.

Figure 3 represents the rotatable disk adapted for the analysis of the beam sent through the film in cooperation with the radial slits which are shown only upon one sector of said disk.

Figure 4 shows the complete disk and the stationary device which comprises a horizontal slot by which the analysis is completed.

Figures 5, 6, 7 are detail views on a larger scale showing the direction of the slits.

Figure 8 is a diagrammatic view of a film image, showing the succession of the elements which are analyzed.

The said arrangement comprises the following parts:

(1) A projection apparatus adapted for the travel of the film containing the animated drawings or designs which are to be reproduced upon the lamp board.

(2) An analyzing device used with each rotatable disk, adapted for the successive exploring of the several elements of each film image.

(3) A photo-electric relay acted upon by the light occasioned by the travel of a white element of the film in coincidence with the analyzing device.

(4) An amplifying device, for amplifying the current supplied by the circuit comprising the said photo-electric cell (when this latter receives light) this amplifier having a sufficient intensity to effect the lighting of the corresponding lamp on the board.

(5) A rotatable distributing device, comprising a number of contacts equal to the number of lamps on the board, said distributing device being so arranged that the contact will be made by a brush with a given lamp of the board at the time at which the element corresponding to this lamp on the film is being analyzed; according as this element is transparent or opaque, it will act, or not act, upon the photo-electric cell, and the corresponding lamp will be lighted or not.

(6) A luminous board consisting of electric lamps whose number equals that of the elements of each image of the film, and which are arranged in a like manner.

The motion picture projection apparatus serves only for the travel of the film and for the projection of the light, and it is in mechanical connection with the analyzing device whose motion is in exact synchronism with the travel of the film. In the arrangement herein employed, and on the contrary to what takes place in the known motion picture apparatus, the film is unrolled with a uniform motion and without any stopping when each images moves before the lens. The illuminant S (Fig. 9) consisting of an electric arc or of a powerful incandescent lamp whose filament is concentrated in a point or is rectilinear, sends light upon a condenser comprising, among others, a cylindrical lens whose axis has such position as to concentrate upon the film a beam which is horizontal, or more exactly, parallel with the direction of the stationary analyzing slot which will be further mentioned. The projection takes place upon the analyzing disk, in whose plane the real image of the film is produced.

The film employed is of the standard motion picture type. The rectangular image acted upon by the light during each exposure is divided into a certain number of identical horizontal bands (24 in the case of the figure) each of which comprises a certain number of equal elements (32 in the case of the figure). These two numbers, whose product is equal to the whole number of elements and to the whole number of lamps, have an arbitrary value.

Figure 9:
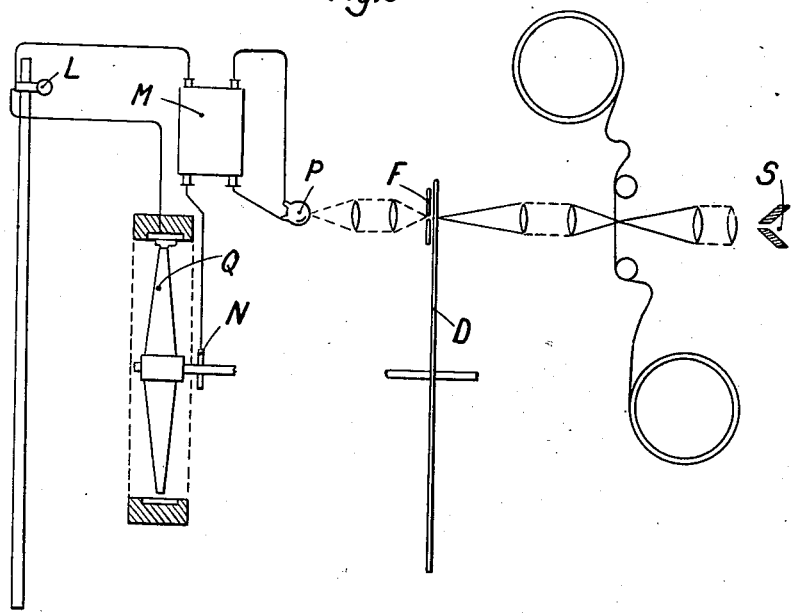
Figure 9 is a diagrammatic general view of the apparatus.

The analysis of the successive elements is effected by means of two crossed slits, one of which is stationary and corresponds to an exploring band, and when the film travels, the elements of the successive bands to be explored are brought into coincidence with the said slit. The analysis of each band is effected by the other slits which are movable and are in the radial position with reference to the periphery of the rotatable disk shown in Figures 3 and 4. The stationary slit and the disk have such position that the intersection of the stationary slit and one of the movable slits of the disk may select a single element of the real image which is projected upon the rotating disk. The stationary slit is almost in contact with the rotating disk D (Fig. 9). The dimensions of the disk and of the analyzing slits wil depend upon the position of the projected image and upon its dimensions. The disk makes a complete revolution during the time of travel of one image of the film, and thus if the element 1 (for instance) of one image is analyzed at the commencement, the element 1 of the next image will be analyzed when the disk has made exactly one revolution. The number of radial slits in the disk is equal to the number of elements of an image in the direction of the length of the film, or 24 in this example; the said slits are designated in the drawings, by $B_1, B_2 \ldots B_{24}$.

One sector of the disk, represented by the angle $AOB_1$ (Fig. 3) whose value is $$\frac{2\pi}{19}$$

is not used for the analysis.

The remainder of the disk, or a sector represented by $$\frac{2\pi \times 18}{19}$$

is provided with analyzing slots which are uniformly spaced. The distance of the projection, and hence the position of the disk, is so regulated that the width of the real image will be 50 mm., and hence the linear dimensions of the film image will have the ratio of $$\frac{50}{24}$$

If the image moves downwardly when the film travels, and if the disk rotates in the clockwise direction, the analysis will be made by successive horizontal bands, from left to right, and the first element analyzed will be the element $E_1$ (Fig. 8); the last element of the first band is the element $E_{32}$, and the analysis continues upon the next band, from the element $E_{33}$ to the element $E_{64}$, and so in as far as the element $E_{768}$. The sector $AOB_1$ of the disk then comes before the slit F, and this corresponds to the travel of the inoperative part situated between two successive images. The analysis of the following image recommences in exactly the same manner. The radial slits of the disk thus have the same width as an element of the real image projected upon the disk, or in this example, $$\frac{50}{32} = 1.562 \text{ mm.}$$

When the first slit, which coincided in the first place with the element $E_1$, leaves the element $E_{32}$, the image has moved downwardly by $\frac{1}{24}$ of its vertical dimension, so that the next slit will coincide at this time with the element $E_{33}$, and so on.

The analysis takes place in this manner by horizontal bands for each image. In reality, since the image moves downwardly while one of these horizontal bands is being explored, the stationary slit which serves to explore the band must not be placed horizontally, but according to an oblique line whose direction is shown at AB in Figure 7. The width of said slit corresponds to $$\frac{18}{24} \times \frac{50}{24} = 1.562 \text{ mm.}$$

Referring to Figure 5, it will be observed that it is possible to calculate the value of the radius OA of the circumference upon which the analysis of the successive elements is made, by simply using for this calculation the known lengths and angles, which are:

1. AC=50 mm., or the maximum dimension of the real image projected.
2. The angle $$\gamma = \frac{\pi \times 18}{19 \times 24} = 7°17'8.5''$$

It is shown by a simple calculation that $$2R = \frac{50}{\sin \gamma} + \frac{50 \times 9}{24 \times 12 \cos \gamma} = 395\,838 \text{ mm.}$$

which is the diameter of the circumference on which the analysis will be made.

Figure 1:
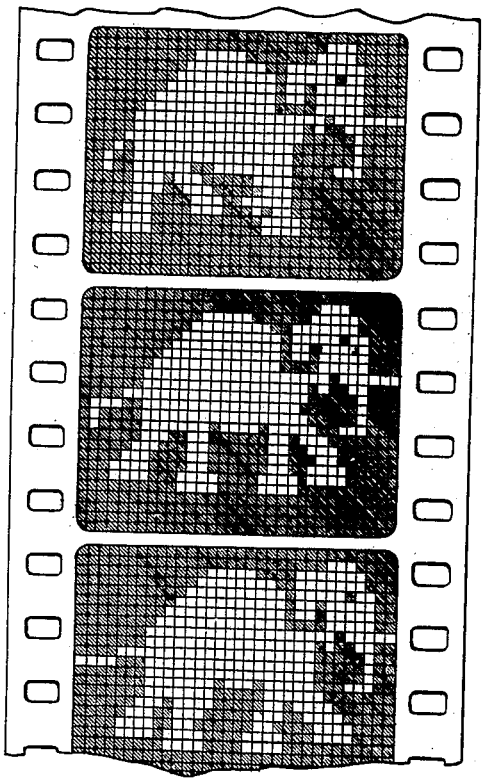
Fig. 1 shows on double-scale, a portion of a motion picture film in which each image consists of a square pattern comprising 768 elements, or 24 elements in the smallest dimension and 32 elements in the largest dimension.
Figure 2:
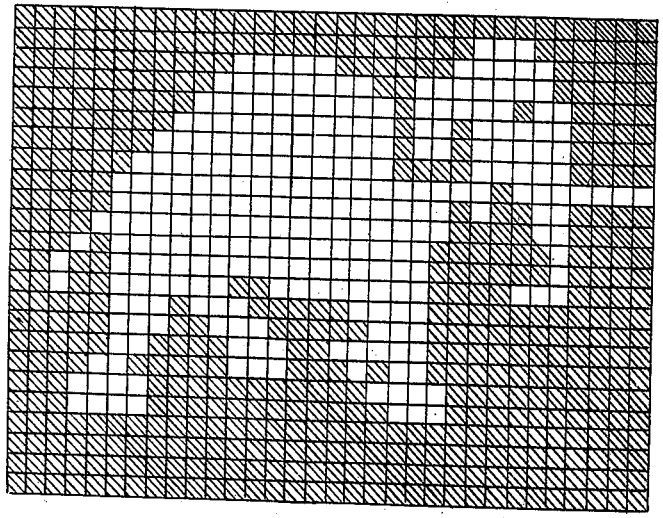
Figure 2 represents the lamp board which contains 768 lamps, the same number as that of the elements of the film, and this board will exactly reproduce the object represented on the first of the three film images of Figure 1.
Figure 10:
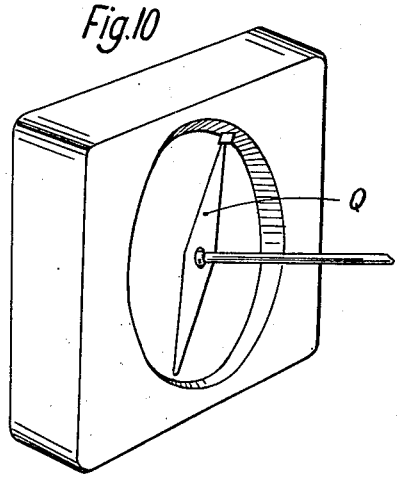
Figure 10 is a diagrammatic perspective view of the distributing device controlling all the lamps of the board.

In further explanation of the above formulæ as applied to the drawings, if we assume the image in the plane of the screen, as shown in Fig. 1, is 50 mm. broad and each image divided, in a horizontal direction, into 32 elements and, in the vertical direction, into 24 elements, as shown in Figs. 1 and 2, it results that the disk, shown in Figs. 3 and 4, must have 24 radial slots from $B_1$ to $B_{24}$, the breadth of which should be $$\frac{50}{32} \text{ mm.}$$

The slot AB (Fig. 7) which is nearly horizontal has the same breadth since the elements are square but the slot is inclined due to the displacement in height of the image, during the rotation of the screen disk.

The reckoning of the radius of the screen disk is made according to the illustration in Figure 5. The upper edge of the fixed slot is illustrated at AB and the radius of the disk is $$OA = OC' = \frac{HC'}{\sin \gamma}$$

OH being the perpendicular to the chord AC'. But $$HC' = \frac{AC'}{2} = \frac{AC}{2} + \frac{CC'}{2}$$

and $$AC = 50 \text{ mm.}, \quad CC' = BC \tan \gamma$$

BC is the displacement in height of the image during the analylsis of a horizontal line, i. e.

$$\frac{50}{32}.$$

Consequently $$CC' = \frac{50}{32} \tan \gamma$$

and $$HC' = \frac{50}{2} + \frac{50 \tan \gamma}{32 \times 2}$$

hence $$2R = \frac{2HC'}{\sin \gamma} = \frac{50}{\sin \gamma} + \frac{50}{32 \cos \gamma}$$

$\gamma$ is the half of the twenty-fourth part of the $$\frac{2\pi \times 18}{19}$$

sector used on the screen disk for the analysis of each film image ($\gamma = 7°17'8.5''$).

The diameter of the rotating disk will be made somewhat larger, in order that the analysis may take place about midway on the length of the slits.

The analysis of the film may also be effected by using the abrupt or jerky motion of the usual motion picture apparatus, which comprise an obligatory stopping period when each image coincides with the lens, and in this case the disk should be a Nipkow wheel pierced with holes of the proper size and situated according to a spiral.

The beam of light issuing from an element under analysis is brought, by means of a set of two converging lenses, upon the photo-electric cell P.

The cell is mounted in the circuit of a battery supplying the necessary accelerating potential, the circuit being closed through a high resistance in which the photo-electric current produces a fall of potential which acts upon the grid of the first valve of an amplifier, to which is added a second amplifier, the whole being contained in a case M. The first amplifier may comprise three valves, and the second is an amplifier of power whose capacity is sufficient to effect the lighting of one of the lamps of the luminous board, in their conditions of operating. In the present example, the amplifier of power will afford a minimum of 100 watts modulated. On the other hand, the amplifier must be adapted to the variations of frequency of the current to be amplified, and the limits of such variations will depend upon the rate of travel of the images to be reproduced.

One of the output ends of the amplifier is connected, on the said lamp board, with a common terminal serving as a ground connection for all the lamps of the board, whilst the other end is connected (by means of a contact piece and a ring N mounted on the shaft of the rotary distributing device) with the brush Q of said device, which supplies the current to the different lamps L of the board, through the medium of contacts provided around the periphery of the distributing device. The rotating brush turns in synchronism with the exploring disk and it moves in succession over all the contacts, thus lighting in turn all the lamps of the board, which corresponds to the bright or white parts of the image. The connection between the film, the rotating disk and the distributing device is such that at the instant at which a given white part of the image to be reproduced is analyzed, the cell receives, during the time of the exploration of this element, a luminous impulse which gives rise to an electric oscillation, and this, when suitably amplified, is sent by the distributing device which makes the contact at this time, to the corresponding lamp of the board, and the lamp is thus lighted.

In the present case, the contacts have 1 mm. width and are spaced apart by 0.5 mm. of insulation, being so arranged that the 768 contacts are uniformly spaced upon a sector of a circle corresponding to an angle of $$\frac{2\pi \times 18}{19}$$

the remaining angle corresponding to the inoperative angle of the analyzing disk, that is, to the part representing the interval, not analyzed, between two successive images of the film.

The lamp employed for the luminous board may be of any type employing a luminous gas or a metallic filament; but in the latter case, the amount of energy imparted to a lamp during the very short time in which it is supplied with current should be sufficient to light the filament. The lamp should operate on a considerable excess of voltage, and the amplifier should thus furnish a rather high power. In the present case, the lamps are of a type adapted for a permanent voltage of 2.5 volts and have a resistance of about 15 ohms. These lamps carry current for a very short time, or about $$\frac{1}{15,000}$$

second for 768 lamps, and it thus becomes necessary, in order to obtain a sufficient lighting, to supply them at about 40 volts, and they are well adapted to support the corresponding current.

Obviously, the arrangement herein described and represented by the accompanying drawings is not of a limitative nature, and it is susceptible of various modifications without departing from the principle of the invention as disclosed at the beginning of the description.

I claim:

Mechanism for obtaining luminous animated images, comprising a panel containing a number of lamps arranged in a square pattern, a luminous source of light, a film adapted to pass in front of the source of light, said film consisting of images made up of square elements either wholly translucent or wholly opaque, said elements being arranged in all the images in the same way and of the same number as the lamps of the panel, and in such a way that each element corresponds to one of the lamps and to one only, a photo-electric cell, means for isolating and allowing to pass in succession the light coming from each of the said elements and for concentrating it on the photo-electric cell, an amplifier to amplify the current emitted by the said cell, and means for distributing at each instant the current to the lamp corresponding to the element of which the passage causes the said current, the distribution of the currents due to all the elements of a given image during a time corresponding to the persistence of the luminous impressions on the retina, so that a lamp does not appear to be extinguished unless the corresponding element of the following image intercepts the light.

ROBERT ALPHONSE COLLARD.